(12) United States Patent
Bugni

(10) Patent No.: US 7,404,585 B2
(45) Date of Patent: Jul. 29, 2008

(54) AERODYNAMIC HEMISPHERE AND SOCKET MOTORCYCLE FAIRING

(76) Inventor: Charles Dominic Bugni, 530 Taylor Rd., Cle Elum, WA (US) 98922

( * ) Notice: Subject to any disclaimer, the term of this patent is extended or adjusted under 35 U.S.C. 154(b) by 0 days.

(21) Appl. No.: 11/784,885

(22) Filed: Apr. 9, 2007

(65) Prior Publication Data

US 2007/0170744 A1 Jul. 26, 2007

(51) Int. Cl.
*B62J 17/00* (2006.01)
(52) U.S. Cl. .................................. 296/78.1; 296/181.5
(58) Field of Classification Search ............. 296/180.1, 296/181.5, 78.1; D12/110, 107
See application file for complete search history.

(56) References Cited

U.S. PATENT DOCUMENTS

| | | | | |
|---|---|---|---|---|
| 2,035,462 A | * | 3/1936 | Courtney | 280/288.2 |
| D144,344 S | * | 4/1946 | Alexander | D12/12 |
| 2,792,899 A | * | 5/1957 | Piatti | 180/229 |
| 4,311,335 A | * | 1/1982 | Winiecki | 296/78.1 |
| D270,436 S | * | 9/1983 | Gaddi | D12/110 |
| 4,536,005 A | * | 8/1985 | Tanaka et al. | 296/78.1 |
| 4,964,484 A | * | 10/1990 | Buell | 180/219 |
| 5,685,388 A | * | 11/1997 | Bothwell et al. | 180/219 |
| D396,433 S | * | 7/1998 | Belker et al. | D12/110 |
| 5,820,203 A | * | 10/1998 | Morelli et al. | 296/180.1 |
| D482,638 S | * | 11/2003 | Pedone | D12/110 |
| D493,122 S | * | 7/2004 | Huang et al. | D12/110 |
| 6,942,053 B2 | * | 9/2005 | Hinton | 180/209 |
| 6,951,361 B2 | * | 10/2005 | Keys | 296/77.1 |
| D514,987 S | * | 2/2006 | Hsiao | D12/110 |
| D517,954 S | * | 3/2006 | Ohta et al. | D12/110 |
| 7,032,948 B2 | * | 4/2006 | Khan | 296/78.1 |

* cited by examiner

*Primary Examiner*—Jason S Morrow
(74) *Attorney, Agent, or Firm*—Brian L. Johnson; Davis Wright Tremaine LLP

(57) ABSTRACT

A motorcycle fairing comprised of plastic or composite material fabricated and assembled to form: a front, substantially hemisphere shaped fender or nacelle fairing section which substantially encloses the front wheel of the motorcycle and is affixed to the upper front fork assembly of the motorcycle allowing the front wheel to be turned laterally independent of the attitude of the main frame of the motorcycle; and a frame mounted fairing which intersects and substantially encompasses the hemispherical front wheel fender section within a matching hemispherical shaped socket located in the frontal portion of said frame mounted fairing, which fairing then extends rearward along, and substantially parallel to the main frame of the motorcycle, with both fairing sections together substantially enclosing the front wheel, headlight, and engine of the motorcycle.

1 Claim, 5 Drawing Sheets

PRIOR ART FIG 1
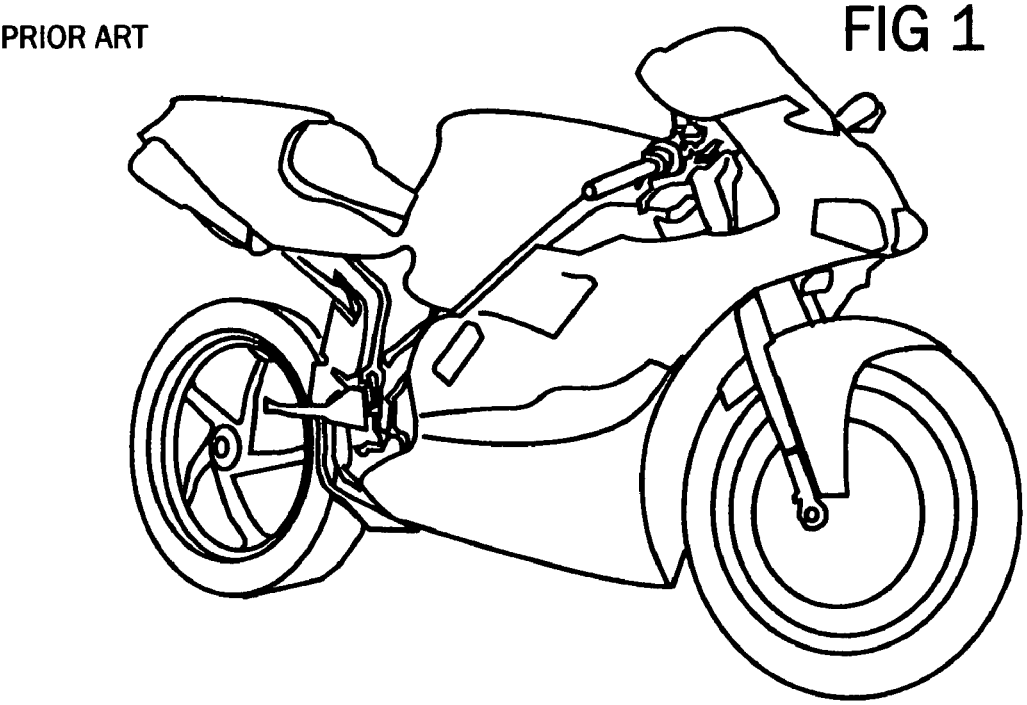
PRIOR ART FIG 2
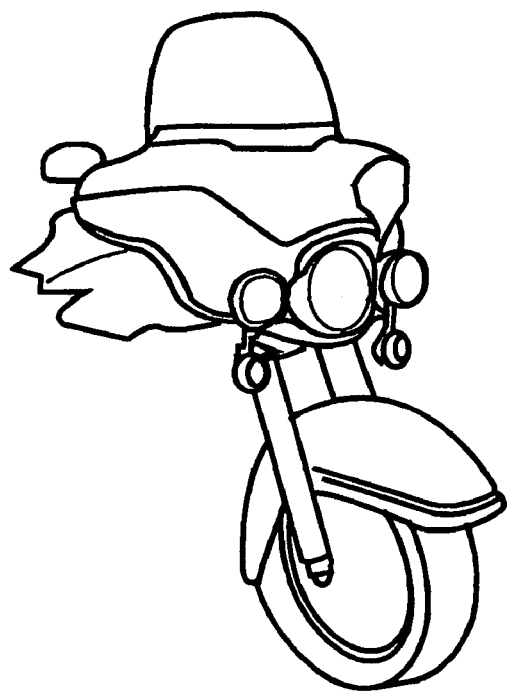

PRIOR ART FIG 3
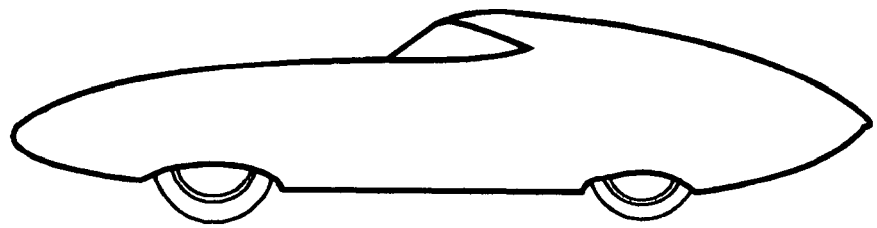
PRIOR ART FIG 4
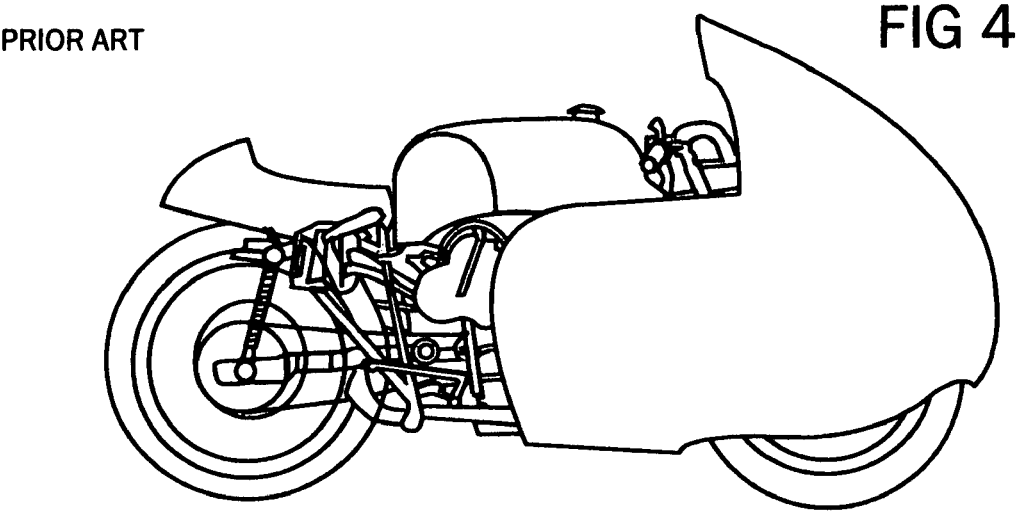

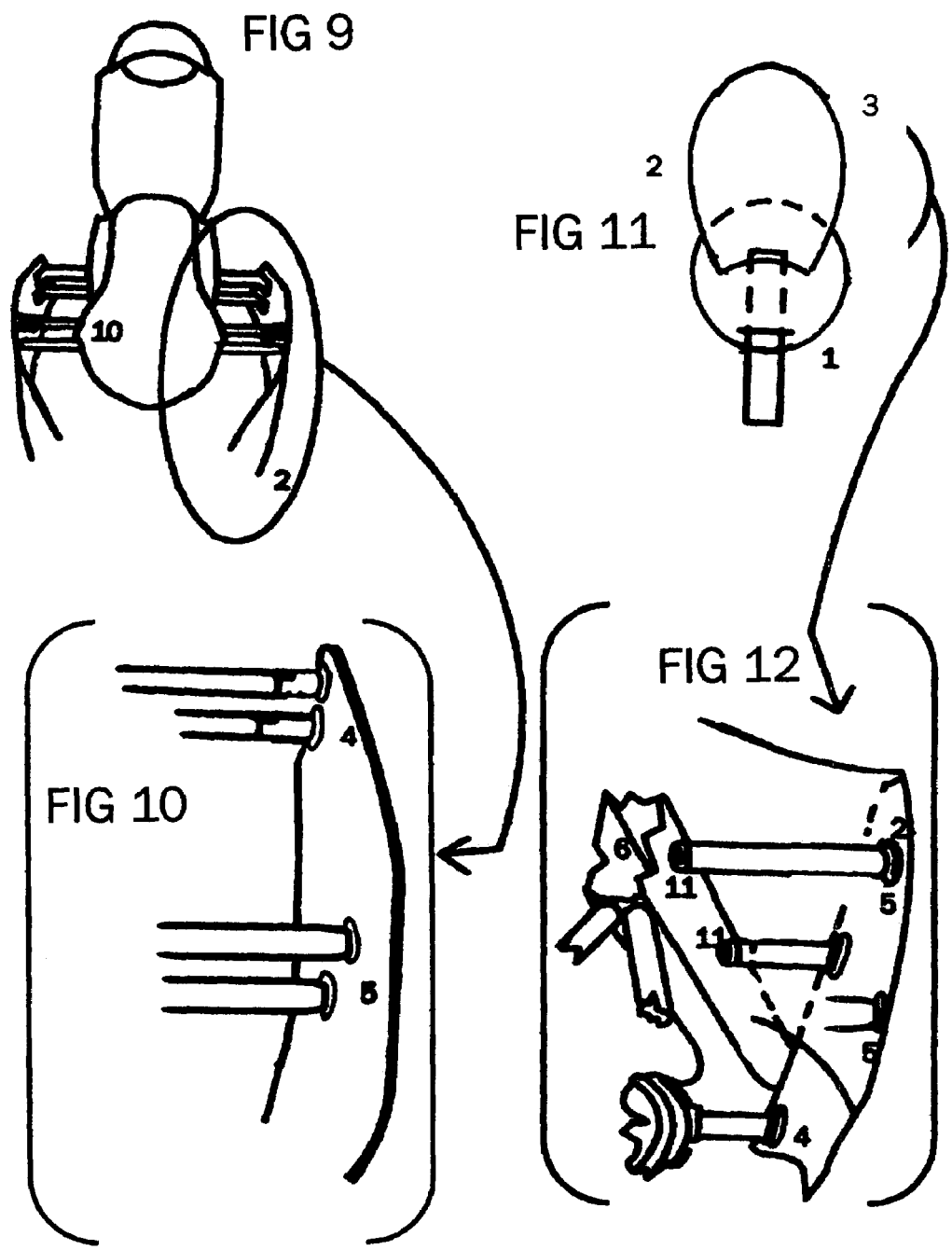

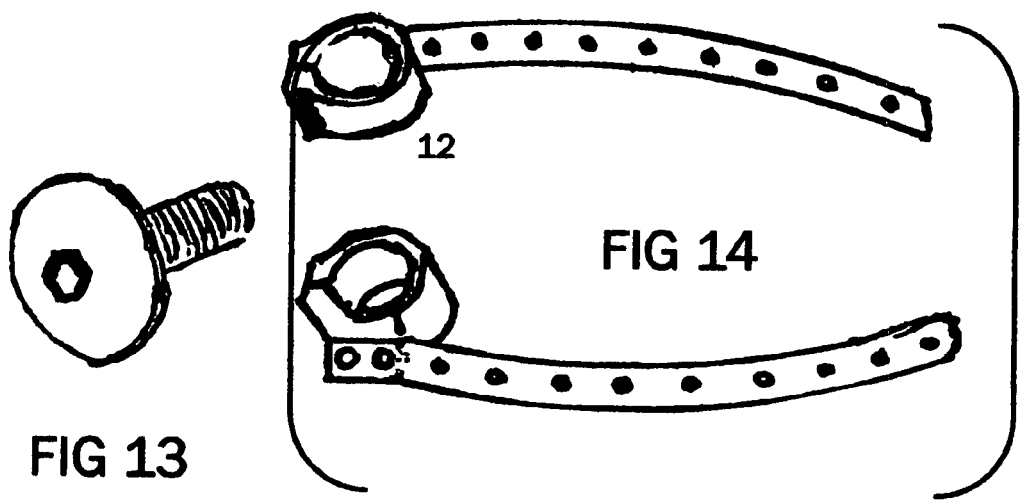
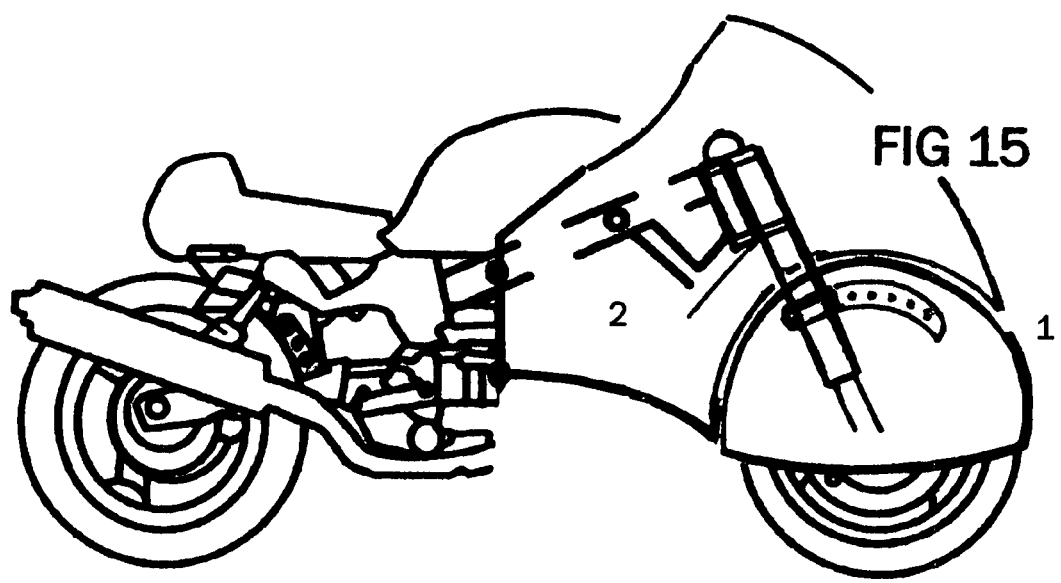

AERODYNAMIC HEMISPHERE AND SOCKET MOTORCYCLE FAIRING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTIING COMPACT DISC APPENDIX

Not Applicable

BACKGROUND OF THE INVENTION

1. Field of Invention

This invention relates to the field of motorcycle fairings, and specifically a means of combining into this invention and improving upon the superior aerodynamic efficiency, and subsequent increased fuel efficiency and performance characteristics attendant to the historical dustbin fairing (substantially enclosing front wheel and fork assembly) design found on road racing motorcycles in Europe of the historical period ranging from approximately 1953 to 1957 when said dustbin designs were relative common usage in competitive motorcycle road racing in, while incorporating the front wheel and fork lateral turning ability of existing fairing types legally suitable for operation upon public roads.

2. Background of the Invention

Existing motorcycle fairings are designed to decrease the negative effects of aerodynamic drag upon the motorcycle and rider, thereby increasing, speed, efficiency, and/or rider comfort. However, all existing fairing types (prior art) suitable for public 'road legal' use are only marginally effective in achieving these goals owing to compromises made in aerodynamic efficiency, in order to accommodate turning of the motorcycle. As the purpose of the new invention is to dramatically overcome the aerodynamic limitations of existing fairings, but in a design also suitable for practical, everyday use—it is necessary to first describe the types of prior art in existence. These fairing types mostly fall into two general categories, both of which encompass motorcycles designed for use on hard, smooth, street or track surfaces. The first general category will be identified as 'road legal', and which will contain motorcycle frontal fairings designed for legal use on public roads. The second general category will be identified as 'specialty fairings,' and will describe motorcycle fairings designed for competitive sport racing; speed record attempts; and fuel, efficiency, and general research testing. A third type of fairing has been proposed by this inventor, in patent application Ser. No. 11/653,452 filing date Jan. 16, 2007, which is an alteration of elements of the first two types, but which is not in substantial use as of the date of this specification. Therefore the following discussion will most emphasize the first two fairing category types noted above, with a discussion of this third type to follow.

Beginning with the road legal category of motorcycle fairings, the types of frontal fairing found on motorcycles designed for legal use on public roads can be generally described as belonging to one of two types, dependant upon the location of the points of attachment used to secure the fairing to the motorcycle. These two attachment-point described types of categories can be described as either: in the first instance—the fork-mounted type; and in the second instance—the frame mounted type. In regard to second type, the frame mounted type has been common in the post World War II period, and the fork mounted type is most probably nearly as old as the existence of the motorcycle itself, having been a natural evolution from the first rudimentary motorcycle windshields developed early in the twentieth century.

In the fork-mounted type, the fairing is generally less expensive, more simple, smaller, and most notably—the fairing is attached to the front forks, and/or handlebar in a rigid fashion, as such as when the motorcycle operator executes a turn by rotation of the handlebar, this type of fairing turns laterally in concert with the front forks, handlebar, and front wheel assembly; and independently of the main frame of the motorcycle comprising the engine, drive assembly, rear wheel, fuel tank, etc. Although the fork-mounted type does provide some marginal degree of wind protection for the rider, the overall value of the fork-mounted fairing is negligible in terms of decreasing aerodynamic drag, and thus increasing efficiency and performance. Because the fork-mounted fairing is not affixed in the forward-most position on the motorcycle, but rather is located above and behind the exposed front wheel, brake(s), fender, headlight, and fork tubes—which together comprise the actual leading edge of the motorcycle into the oncoming air stream—the oncoming airflow encountered by the fork-mounted fairing is already turbulent, 'rough' air. Therefore any opportunity to establish a smooth, or laminar flow of air around such a relatively rearward mounted type of fairing are lost. Further,as the distance between the rear portion of the fork-mounted fairing and the upper torso and head of the rider is a relatively large one—the resultant gap leads to yet more turbulent air which not only reduces the efficiency and performance of the motorcycle, but also increases the buffeting, noise, and general discomfort experienced by the rider.

The second general type of fairing used on road legal motorcycles—the frame-mounted fairing, is attached rigidly to the main frame of the motorcycle, and thus when the motorcycle operator executes a turn by rotation of the handlebar, the fairing does not turn laterally with the front forks, handlebar, and front wheel assembly. As in the fork-mounted type described above—the principal functions of the frame mounted fairing are to decrease the aerodynamic drag and its effects upon the motorcycle and the rider/operator, thus increasing the performance and efficiency of the motorcycle, while also increasing the wind and weather protection for the rider.

Unlike the handlebar-mounted type fairing which is mounted above and somewhat behind the leading edge of the front wheel—the frame-mounted type, although also located above and behind the leading edge of the front wheel—the frame mounted type additionally encloses some of the lower portions of the main frame of the motorcycle, often including the engine, transmission, and portions of the engine air intake and exhaust components.

However, like the handle-bar mounted type, the frame mounted type also does not enclose the aerodynamic leading edge of the front wheel, forks, and brake assembly which encounter the oncoming headwind. Nor does either of these types cover more than a very small fraction (if any at all) of the area of the total lateral diameter of the front wheel and tire assembly, This lateral area being the total circular area of the combined front wheel assembly visible when said assembly is viewed from either side of the motorcycle.

Although in most cases a fender (also known as a mudguard) does cover a portion of the exterior circumference of the front wheel and tire assembly, the portion of the total lateral area of front wheel and tire assembly that is covered by the fender is marginal (if any at all), and if any aerodynamic drag reduction does result from the shape of the fender, it is generally incidental to the intended primary function and design of the front fender which is to protect the motorcycle engine components, and rider from foreign objects and water propelled upward as the result of the rotating front tire's interface and contact with the road surface, and foreign object thereupon. Although in a few instances of road legal motorcycles, some fenders or mud-guards have been designed with some very small degree of aerodynamic efficiency in mind, in no case are the fenders an integral part of the fairing itself, but rather a completely separate part or component.

Although generally covering a larger area of the motorcycle, than the fork-mounted type; as the frame-mounted type of fairing does not extend to, nor cover the front wheel, brake, fender, and fork assembly—thus leaving these latter components again to act as the leading edge of the motorcycle into the oncoming air stream. Therefore although the frame-mounted type of fairing may provide a somewhat decreased level of aerodynamic drag when compared with the fork-mounted type, or the motorcycle sans any fairing—like the fork-mounted type—the rearward leading edge of the frame-mounted type again results in the airstream that encounters the fairing to be a turbulent, rough airflow that again makes smooth or laminar airflow over the fairing virtually impossible. Although it is true that the frame-mounted type does generally provide better aerodynamic drag reduction as compared to a fork-mounted type, or motorcycle without any fairing at all—it is still only a marginally efficient aerodynamic shape due to the fact that the leading edge of the entire vehicle is comprised of the rough and irregular shapes and edges of the front wheel, brake, fender, and fork assembly. In terms of aerodynamic efficiency then, the shape of the leading edge of any airfoil is critical—thus the rough and irregular shapes of the leading edges of the motorcycle, cannot be efficiently overcome to any large degree, no matter how smooth the frame-mounted fairing exists over the medial and posterior parts of the motorcycle. In other words, the front wheel, brake, fender, and fork assembly of a motorcycle must be wholly or substantially enclosed to attain the most of aerodynamic drag reduction benefits.

The frame-mounted type fairing is also further designed to allow for the flow of the oncoming airflow to contact the engine fluid cooling units, in the form of both the coolant radiator, and/or the engine oil cooler, at an angle of attack which is directly perpendicular to the direction of travel of the motorcycle and the resulting oncoming airflow. Although this does allow for maximum cooling efficiency of the radiator and/or engine cooler, it also dramatically the aerodynamic drag effect upon the vehicle, thus reducing overall efficiency and performance. An analogous example in nature which approximates the frame-mounted fairing would be the salmon. If one envisions a healthy salmon traveling up a river into the current, one can easily appreciate the smooth, efficient sleek design of the body of the fish. If one were to then imagine the salmon swimming up the same stream into the same current—but now with its mouth wide open—one can appreciate both the effect upon the progress of the fish (or the similar shape of a motorcycle equipped with a frame mounted fairing), when the very efficient latter portion of the body of the fish (or said motorcycle), is largely negated by the blunt open mouth.

Turning to the Specialty category of motorcycle fairings as opposed to the road legal types described above—these special types of fairing can be differentiated and categorized into two basic types, with the determinate criteria not being the method of attachment (as is the case with the road legal type) but rather by the degree or amount of the motorcycle which is either partially or fully enclosed by the respective fairing type.

The first of these two types is commonly known as the streamlined, or fully enclosed type. This type of fairing usually is constructed as a single fully enclosed body, which resembles, and is constructed similarly to that of a modern low drag/high speed aircraft fuselage. In this type, the outer surface or skin of the fairing is generally cylindrical in shape, with only small openings at the front and rear wheel locations of the motorcycle to allow for minimal, vertical protrusion of the front and rear wheels to a distance minimally sufficient for clearance of the lower main body of the fairing from the ground surface. Additionally, small holes or openings may exist for engine cooling, intake, or exhaust functions. A small aircraft style enclosed canopy, or aerodynamically designed open-topped windscreen is usually also incorporated into the fairing's upper surface, to allow the operator a visual portal to control the vehicle, while also minimizing frontal surface area. This type of fairing is used almost exclusively for competitive speed record attempts, wherein the vehicle is not required to make any significant turns, but rather travel only in a straight line, at the highest possible speed. As the design of this type of fairing is designed for maximum aerodynamic reduction, but is not concerned with the turning necessary of practical everyday transportation, it can be, and is made as narrow as possible, with the rider being fully enclosed within the fairing after entering the vehicle through a door or moveable panel, which is located on the top or side of the fairing. Therefore although this type of fairing is truly very aerodynamically efficient, the inability of the front wheel to turn laterally, to any practical degree, combined with the inability of the rider to extend his legs and feet outside the vehicle when coming to a full stop—render this type of fairing essentially useless for public road or practical use.

The second of these special fairings, is commonly known as the dustbin fairing. The name of which traces its origin to the decade of the 1950's, wherein the fairing's appearance (when viewed from the side), strongly resembled the shape of the common dustbin with handle, used domestically as a household tool in conjunction with the common broom, to remove floor sweepings. The most apparent, and defining characteristic of the dustbin style fairing, it the shape of the front of the fairing, which substantially encloses the front wheel and tire assembly, with the fairing attached. This type of fairing was used from approximately 1953 until 1956 in closed course motorcycle road racing, principally in Europe, and most notably in Grand Prix motorcycle racing circuit, until the dustbin was banned in European competition by the sanctioning body of those events. In addition to the substantial enclosure of the front wheel and tire assembly, the dustbin fairing was attached to the motorcycle by attachment points located on the main frame of the motorcycle, and protruded forward from the main frame to enclose most of said front forks, wheel and tire assembly. As such the dustbin fairing was not directly attached to the front forks or handlebars of the motorcycle, but rather frame mounted in the same fashion as the previously described road legal frame-mounted type.

Although this configuration allowed some lateral turning of the front forks and wheel and tire assembly by laterally rotating the handlebar, such turning was limited to only a few degrees of rotation to either the left or right, as the enclosed wheel and tire assembly, as well as the handlebar and front forks, would come into almost immediate contact with the interior of the sides of the frontal portion of the fairing encompassing the front wheel, which severely limited the ability for the rider to execute any turn of more than a few degrees, thus rendering the motorcycle equipped with the fairing to be extremely difficult to use for any purpose other than competitive road racing, and thus inconvenient and wholly unsuitable as a means of practical transportation. Further in an effort to provide these dustbin fairings with this small degree of ability to turn, a large opening or hole would be incorporated to allow the front wheel to turn laterally. Although this did marginally allow for some ability to turn the motorcycle laterally—the opening itself allowing such movement, was itself a deleterious to the dustbin design, as the opening greatly increased drag and turbulence on the under side of the fairing, as smooth, laminar airflow over the nose of the fairing became turbulent, rough air upon encountered the large gap found to either side of the front wheel, brake, fender, and fork assembly, on the bottom of the fairing.

A final characteristic of the dustbin fairing which is notable, was the effect of cross winds upon the stability of a dustbin equipped motorcycle, especially at high speed. As the dustbin fairing's surface area extended forward of that of the non-dustbin frame-mounted, fairing—the location of the center of pressure resulting from a crosswind blowing laterally from a perpendicular direction upon the dustbin fairing, would more forward, than that of the location of the center of pressure on a non-dustbin motorcycle fairing. However, because of the relatively light weight of the dustbin fairing in relation to the combined weight of the motorcycle and rider, a the lateral aerodynamic center of pressure is moved forward, while the center of mass of the total weight of the vehicle did not move forward to a corresponding amount. Therefore the front of the dustbin fairing equipped motorcycle, was said by contemporaneous accounts to have had an increased tendency to be turned away from the intended straight-line direction of travel, in a lateral fashion, in direct reaction to, and as a direct result of the crosswind imparting a moment of force upon the more forward located, lateral center of aerodynamic pressure found in the forward extending dustbin type. This last characteristic resulted in the dustbin style fairing being given a reputation, as least as far as historical accounts go, as being harder to control in windy conditions than either non-dustbin style fairing equipped motorcycles, or motorcycles without any fairings. Thus from the historical reports from the decade of the 1950', the dustbin type fairing was generally reported, and thus thought to be more dangerous to use in racing conditions in any type of intemperate weather, which, was cited as a major contribution to its exclusion from competitive motorcycle racing in Europe in 1957. However, the principal competing motorcycle manufacturers of the period, may have also had additional, unrecorded reasons for the elimination of the dustbin fairing, owing to both production costs, and aesthetic considerations.

The third general type of fairing which is currently the subject of patent application Ser. No. 11/653,452 and submitted by this inventor on Jan. 16, 2007 is the Aerodynamic Articulated Motorcycle Fairing, which as described in that patent application is a combination of, and improvement upon some of the characteristics of both the frame and fork mounted fairing types. The purpose of that proposed invention, is to combine the aerodynamic advantages of the dustbin style faring with the ability to turn the front wheel as found on a conventional motorcycle. That invention is designed to achieve those ends by allowing the frontal fairing section enclosing the front wheel to turn independently of the frame mounted section by arranging the interface of the two fairing sections, and the frontal fairing rotation, to be arranged such a way as to be perpendicular to the axis of rotation of the front wheel and fork assembly.

3. Objects and Advantages

The overall objectives of the invention described in this patent are to reduce the negative effects of aerodynamic drag upon the motorcycle and rider for the purpose of increasing the fuel efficiency and performance of the motorcycle, while simultaneously increasing the comfort and safety of the rider. More specifically, the objects and advantages of the present invention are to provide aerodynamic drag reduction superior to that of the historical frame-mounted dustbin fairing, which encloses the front wheel and fork assembly, and also that of motorcycles with existing frame-mounted fairings, by additionally improving the aerodynamic efficiency and safety over that of the historical dustbin fairing; while also providing the necessary and practical, lateral turning ability of motorcycles equipped either without any fairing, or with only fork-mounted fairings; and additionally achieving these goals to a degree superior to the fairing type which was submitted in patent application Ser. No. 11/653,452 by this inventor—by the following objects and advantages of the present invention:

To provide the superior aerodynamic leading surfaces attendant to the enclosure of the leading edge of the front wheel and fork assembly and handlebar, by an aerodynamic, hemisphere shaped, frontal fairing section attached directly to the front fork assembly, with a frame mounted fairing shaped and extending forward to form a socket around the front fork assembly and sides of the motorcycle, between the upper and lower frontal fairing sections without significant gap or spacing.

To provide the ability for the rider to execute a turn of the motorcycle to a degree found on any other road legal motorcycle, equipped with or without a fairing. By mounting the frontal fairing portion only to the front fork assembly, and by positioning the above noted frame mounted fairing hemispherical, socket shaped interior edge to the opposing hemispherical shaped edges of the frontal fairing section, and by shaping these edges to be positioned in relation to the axis of rotation of the front fork assembly, to thus allow the frontal section—when the rider rotates the handle bar laterally to execute a turn—to freely rotate independently of the frame mounted fairing section within the socket, and to return to then return to its original position with the frame mounted fairing socket section once the handle bar is returned to its original position, thereby allowing the rider to execute any turn, with full freedom of lateral rotation of the handlebars in either direction.

and to further provide that ability to turn without the large lateral hole or opening found on the bottom of the historical dustbin fairing located to both sides of the front wheel, which is eliminated in this invention by the fairing section enclosing the front wheel, being mounted only to the front fork assembly, thus turning in common laterally with the front fork and wheel assembly, thus allowing for very close lateral spacing between the front wheel and the fairing, which again results in a more aerodynamic and efficient surface.

to provide increased linear stability of the motorcycle from the effects of crosswinds, by moving the center of mass of the motorcycle forward by utilizing the void created by the fairing enclosure above the front wheel, to install auxiliary motorcycle components such as the battery, headlight, toolkit, radiator, and cooling fluid reservoir, this alternately would have the effect of increased linear stability of the motorcycle in crosswind conditions by moving the lateral center of air pressure rearward in relation to the lateral center of mass, and thus creating a weather vane effect, wherein the center of lateral air pressure, having moved further to the back of the motorcycle in relation to the center of mass, thus resulting in cross winds having a tendency to push the rear of the motorcycle downwind from the front of the motorcycle, thus at least partially negating the effect of crosswinds upon the lateral direction of the front of the motorcycle, to provide improved lateral stability and cornering adhesion of the front tire, by moving the location of the auxiliary components noted above, from the more customary rearward mounting locations to the more forward area within the spatial void created there above the socket portion of the fairing approximately above the front hemisphere fairing and wheel.

to provide further increases in the aerodynamic efficiency of the fairing by incorporating the front turn signals into the surface and contours of the fairing;

to provide superior wind and weather protection for the rider, and especially for the rider's legs and lower body;

to provide reduction of wind buffeting and noise, by the superior smooth aerodynamic shape of the invention over the rough exposed surfaces created by the many forward-located components not enclosed on other types of motorcycle fairing;

to provide increased front wheel traction and stability by increasing aerodynamic down forces upon the front wheel of the motorcycle.

to increase storage area by using that space under the seat that is most commonly used for items such as the battery and took kit from that traditional location under the seat of the motorcycle, thereby creating an additional storage space.

BRIEF SUMMARY OF THE INVENTION

A motorcycle fairing consisting of a fork mounted, hemisphere shaped frontal section which together with a frame mounted fairing which forms an enclosing socket, combine to form a fairing substantially enclosing the front wheel, front fork assembly, and engine of the motorcycle, thus providing substantial aerodynamic protection for the rider along with the aerodynamic advantages superior to the aerodynamically efficient, historical dustbin fairing. This is achieved by constructing a hemispherical front wheel fairing which substantially encloses the front wheel, to be surrounded by a socket formed out of the frame mounted fairing, which is constructed to match and accommodate said hemispherical shape, and for both hemisphere and socket fairings to be mounted in relation to one another, and the axis of rotation of the front fork assembly, to allow lateral rotation of the front hemisphere, within the frame mounted portion, without binding. Finally by using the void created within the shape of the frame mounted fairing, located above the front wheel, to relocate some of the motorcycle components, and thus allowing the center of mass of the motorcycle to move forward, distributing more weight upon the front wheel thus increasing control, safety, efficiency, and comfort for the rider.

BRIEF DESCRIPTION OF THE DRAWINGS

FIG. 1 is a view of the prior art described in the text of the background of the invention as belonging to the category of road legal motorcycles; and is a perspective view example of a motorcycle with a frame-mounted fairing type;

FIG. 2. is a perspective view example of a fork mounted fairing showing only the fairing and the frontal portion of a motorcycle to which it is attached.

FIG. 3 is side view of an example of the streamlined type as described in the text of the background of the invention as one of two types belonging to the specialty category.

FIG. 4. is a side view of an example of the historical dustbin fairing as again described in the text of the background of the invention as the second type of fairing in the specialty category.

1.—denotes the location of the hemisphere shaped front fairing section, substantially inclosing the front wheel, and mounted to the un-sprung portion of the front fork assembly.

2.—the frame mounted fairing section which forms the socket around the front fairing section, and substantially encloses the engine of the motorcycle.

3.—denotes the area of the frame mounted section and underlying motorcycle frame shown in FIG. 11, that is shown in a semi-transparent view in FIG. 12.

4.—the locations where the frame mounted fairing affix same to the motorcycle frame.

5.—the locations at which the forward attachments of the frame mounted fairing attach same to the main frame of the motorcycle near, and just below the headstock of the motorcycle frame.

6.—A cut away view of the main beam of the motorcycle frame as it is located just behind the location of the headstock of the motorcycle frame, FIG. 12.

10.—Represents the fuel tank.

Figure 6:
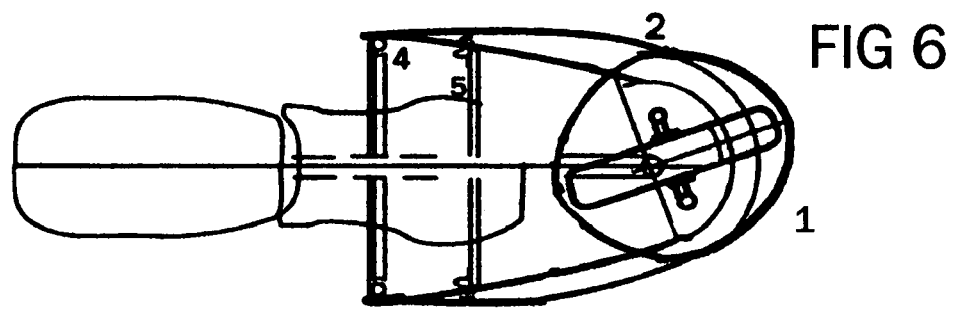

FIG. 6. is a perspective from above and slightly behind the motorcycle, and viewing parallel down the down the axis of rotation of the front wheel and fork assembly, with the hemisphere shaped frontal fairing section and fork assembly turned to the left. Numbers 1 and 2 represent the frontal fork mounted hemisphere section, and the frame mounted section forming the socket respectively. Numbers 4 and 5 represent the frame mounted fairing connections to the main frame of the motorcycle.

Figure 7:
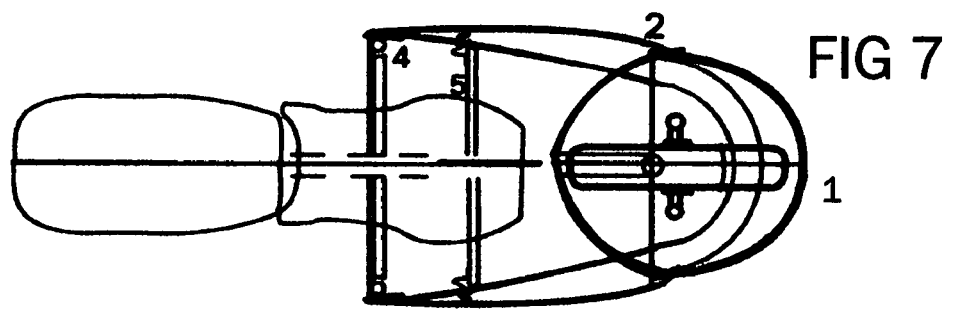

FIG. 7. is again a perspective from above and slightly behind the motorcycle with the hemisphere shaped front fairing section and front fork assembly in a straight ahead position. As in FIG. 6, the point of view is looking approximately parallel down the axis of rotation of the front fork assembly at the headstock of the motorcycle frame.

Figure 8:
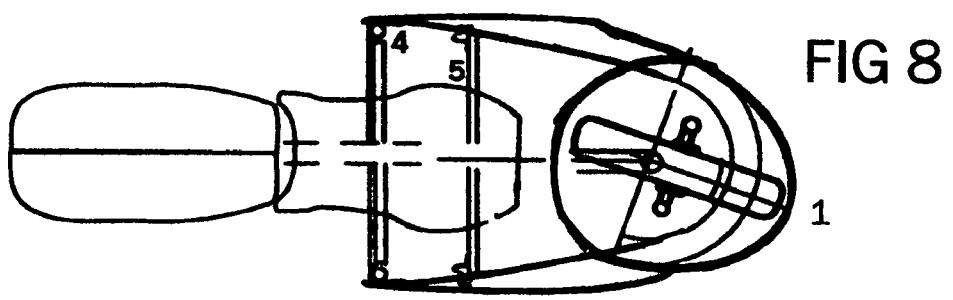

FIG. 8. is another view from a perspective from above and slightly behind the motorcycle with the hemisphere shaped front fairing section and front fork assembly, turned to the right.

FIG. 9 is an incomplete view of the motorcycle and the frame mounted fairing, number 2 from a perspective above and in front of the motorcycle, showing the general relationship of said section to the main portion of the motorcycle, behind the headstock of the motorcycle frame, and without the front fork assembly shown.

FIG. 10. is a more detailed view, principally of the interior of the side of the frame mounted fairing section from a perspective of above and slightly forward and to the right of said portion of the fairing section showing the attachments, number 4, near the rear of the interior of the side panel; and the attachments, number 5, which would be affixed near the headstock on the frame of the motorcycle.

FIG. 11. is a frontal view of the motorcycle demonstrating the approximate positioning of the hemisphere shaped frontal fairing section, within the socket formed by the frame mounted fairing section which partially envelopes the frontal section within a curved shaping, or cutout of the frame mounted section fabricated to mirror the shape of the front hemispherical section. Number 3 emphasizes the area of inner connections as shown in below FIG. 11, in FIG. 12.

FIG. 12. is an internal view of the left front portion of the area as emphasized on the front view of the motorcycle and the invention as number 3, FIG. 11., of that portion of the main spar of the motorcycle frame approximately just behind the location of the headstock of the motorcycle frame, labeled as 6.

FIG. 13. is the type of bolt, known as the button head type, which along with a self-locking type threaded nut, is to be used in this embodiment of the invention to connect the hemisphere shaped front fairing section to the fork clamp brackets in FIG. 14, which in turn clamp directly onto the un-sprung upper portion of the front fork tubes; and at the frame mounted fairing section to connect the frame mounted fairing section to the attachments numbered 4 and 5, connecting the frame mounted fairing to the main motorcycle frame.

FIG. 14, shows a view of the brackets to be used in this embodiment, with the brackets to be curved to conform to the interior surface of the front hemisphere shaped fairing section.

FIG. 15, represents a transparent side view of both the hemisphere shaped frontal fairing section, number 1; and the frame mounted frame mounted section, number 2, which forms the socket portion around the hemisphere shaped frontal section. Also shown are the mounting brackets shown in FIG. 14. as attached to the un-sprung portion of the front fork tubes, and the potions of the main frame and headstock of the motorcycle in relation to the frame mounted portion of the fairing.

DESCRIPTION OF THE PREFERRED EMBODIMENT

For the purpose of understanding and promoting the principles of the invention reference will be made to the embodiment illustrated in FIGS. 5 through 12 and specific terms will be used to describe same. It should also be understood that no limitation on the scope of the invention is hereby intended by these drawings of the preferred embodiment in regard to the principles of the invention, as other alternative embodiments not shown in said drawings are possible and shall be indicated at the salient points in this description. None of the drawings as represented in FIGS. 1 through 14 are to an exact scale, as several of the views of the drawings are drawn from somewhat unusual perspectives in order to aid in a better understanding of the principles of the invention.

To further aid in the understanding of the principles of the invention, FIGS. 1 through 4 represent the four types of motorcycle fairing prior art as earlier described in the background of the invention. Particularly noteworthy are FIGS. 1 and 2 which show examples of the frame-mounted fairing, and the fork-mounted fairing respectively, and FIG. 4 which is a side view of the dustbin type of fairing, historically used in racing in the 1950's. These existing prior art examples are relevant as the present invention shares functional elements with of all three types.

In other embodiments of the invention, an additional clear windscreen or shield could be formed by molding a sheet of adequately rigid, transparent plastic sheet material, and affixing same to the upper portion of the frame mounted fairing section, number 2. However, as such an addition is more aesthetic than functional, in this embodiment, said clear windscreen shall be omitted, and that portion where said windscreen or shield would be located, shall simply be an elevated portion of the top of the frame mounted fairing section, number 2.

To construct a template for each the fairing portion molds, a plug must first be constructed for each by, in this embodiment, tracing onto plywood sheets (although other sheet materials could also be used) the outline of the various layers or stations of the horizontal cross section of the proposed shape of each of the fairing section portions, and then by cutting out same to form horizontal plywood stations. Repeating the process by tracing out and cutting the desired vertical shape of the desired fairing section portions, a base plate or armature is created, to which the afore mentioned horizontal stations can be attached at right angles. Once said horizontal stations are attached to the base plate a ribbed template will result, but with gaps existing between the horizontal stations, parallel to one another once the horizontal stations have been attached to the vertical base plate at right angles. These remaining gaps between the stations must be covered over and filled in to create the skin or surface of the plug. Again, this can be accomplished in a number of ways, but for the preferred embodiment, a grid of wire screen is stretched over the plywood template and stapled in place. This wire screen is then covered with an automotive type body filler, normally used for auto body repair. This material can be troweled over the surface of the wire screen, and can be rasped or grated to approximate the desired shape one the product, as the product begins to harden as per the manufacturer's directions, or additional body filler can be added as needed to achieve the shape desired. Later additional grating, sanding, or polishing, or spot application of more filler where needed, can be done to perfect the exact shape desired.

When constructing the plug and subsequent final mold to be used to form the desired fairing portion shapes, additional over-lapping tabs, or flanges should be designed into the edge of the fairing section portions, where same will meet other adjoining portion of the same fairing section, to facilitate the interconnection of the fairing section portions to complete each fairing section. At these overlapping tabs or flanges, threaded bolts, FIG. 13, combined with self locking nuts will attach the portions securely together to complete each respective section. These tabs or flanges should be slightly offset on one of the fairing sections, to a depth below the eventual external surface of the finished fairing section, to a depth of the thickness of the fairing section fiberglass material, or skin, to allow for the eventual combined joint between to fairing section panels to form a smooth external surface.

After completion of the plug, laying out and completion of the actual fairing section portion forms, and final completion of the fairing section portions themselves, same will be affixed to the metal attachment points by use of the threaded large headed bolts as shown in FIG. 13, and threaded self locking nuts.

Figure 5:
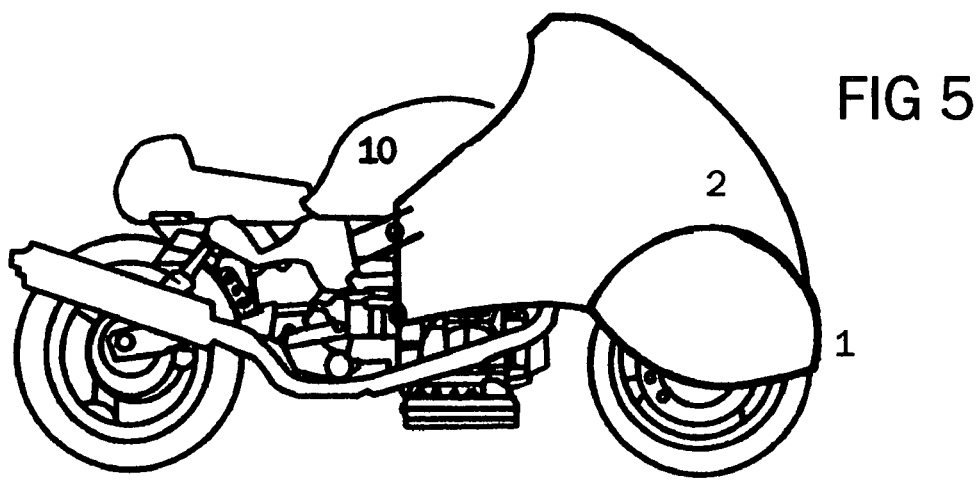
FIG. 5 is a side view of a motorcycle with the embodiment of the invention. Specific items referenced by number on FIG. 5-12 are as Follows.

Referring now to FIG. 5, there is shown a side view of the completed fairing invention mounted upon a motorcycle. The number 1, located just to the right of the invention, denotes the fork mounted hemisphere fairing section, also seen in FIGS. 5-8, 11, and 15., which is mounted upon and affixed to the front fork assembly and thus can turn in concert to the left or right as one unit, with the front fork and wheel assembly. Number 2 on FIGS. 5-8, 11, and 15, denotes the frame mounted fairing section which forms a socket, which in this embodiment is constructed of fiberglass, although plastic or other composite materials could also be used. FIG. 5, number 2, in general relation to the frontal hemispherical section, although not to an exact scale, and not representing the actual spacing or gap between the hemisphere and socket fairing sections.

Item numbers 4 and 5 on FIG. 6-8, and 10 represent the approximate points of attachment for metal tubing posts connecting the frame mounted fairing to the frame of the motorcycle by means of the threaded bolts as shown in FIG. 13, combined with self-locking threaded nuts. The posts of metal tubing upon which the frame mounted fairing section are attached to the main frame of the motorcycle, are formed by welding, stamping or forging, and would vary slightly in overall length, as their respective attachment points on the proximal, or motorcycle-frame end, would vary in length because of the need to have said fairing section attachments located above and below one another to allow a more or less parallel and vertical position of the side of the frame mounted fairing socket section, in relation to the midline, or direction of travel of the motorcycle.

FIG. 12, number 11. In other embodiments, the metal tubing attachments could also be affixed to the motorcycle frame by circular, square, or rectangular clamp. The upper, more frontal of these metal posts shown as number 5, is located upon the main beam or backbone of motorcycle frame near the headstock of the frame, and just under the customary location of the fuel tank. The lower, frontal metal tubing post comprising the lower attachment also shown as number 5, would be of the same configuration and affixed again by threaded nut and bolt to the motorcycle frame, upon in the embodiment, the lateral metal bracing of the frame which extends down and rearward to support and connect the engine of the motorcycle to the frame. At all points described and represented as numbers 4 and 5, the posts of metal tubing would have an smooth metal disk welded, stamped or forged to the outer edge of the post which would be of larger surface area that the cross section of the area of the post itself, to provide a broader contact point for the interior of the side of the frame mounted socket fairing section, and which would provide a larger contact surface area between said fairing section surface and the connection posts of metal tubing.

FIGS. 5-9, 11, and 15, number 2 denotes the frame mounted fairing socket section of the invention.

FIG. 12, number 6 shows the approximate location of the of the frame of the motorcycle immediately behind the headstock of the frame.

In FIGS. 5, and 9, number 10 represents the fuel tank in the position it is most usually found in most motorcycles, and is illustrated only for the purpose of reference.

FIGS. 6-8 are not to scale, representations of the invention attached to a motorcycle and viewed from a perspective above, and somewhat behind the motorcycle, in order to allow a view looking down, and parallel to the axis of rotation of the front fork assembly, wheel, and frontal hemisphere fairing section.

Owing to the distortion of the invention represented by the above described perspective, number 5 on FIG. 6-8 is represented only by a single illustration of the attachment, which in this embodiment is an above described metal tubing post, and attached to the motorcycle frame on the proximal, or frame end of the post, by a threaded bolt and self locking nut, and attached to the interior of the frame mounted socket fairing section at the distal, or fairing end of the attachment post of metal tubing.

FIG. 6-8 also show the dynamic relationship between the frame mounted socket fairing section and the fork mounted hemisphere fairing section and front fork assembly, as the front fork assembly, front wheel, and fork mounted upper and lower fairing sections are shown turned to the left, center, and right, respectively.

FIG. 9. is a view from above and forward of the motorcycle, of the relative relationship of the rearward portion of the frame mounted fairing socket section to the motorcycle, but without showing the front fork assembly, wheel, or front hemisphere fairing section, or the actual socket portion of the frame mounted fairing. In addition emphasis upon interior the left portion of same is shown below in FIG. 10.

FIG. 10 is again a viewpoint above and forward of the side the rear portion of the fairing socket section, with numbers 4 and 5 denoting the approximate locations of the metal post attachments in this embodiment.

FIG. 15 is a transparent side view of the motorcycle, with the front forks shown in relation to the invention and the headstock of the motorcycle, as viewed through the frame mounted socket portion of the fairing, number 2. The front forks, are shown in their position parallel with the semi-vertical position of the headstock of the frame of the motorcycle, and together with same, represent the approximate angle of the axis of rotation for the front fork assembly, front wheel, and front fork mounted hemisphere fairing section, number 1. Also shown is the position of the circular compression clamps with curved brackets within front hemisphere section number 1, which affix said front hemisphere fairing section to directly to the un-sprung portion of the upper, external surface of the fork tubes as shown. With the front hemisphere fairing section being attached to the curved brackets by use of threaded bolts as shown in FIG. 13, in combination with self locking threaded nuts, positioned through holes in both said bracket and fairing section, pre-drilled to intersect with one another for proper positioning of said hemisphere fairing section.

I claim:

1. A motorcycle fairing substantially enclosing a front wheel, a suspended front fork assembly, a handlebar, and an engine of a motorcycle in a single, smooth airfoil allowing smooth, unbroken airflow over said fairing, and allowing full lateral rotation of the front wheel and fork assembly and full operation of the front fork suspension and being comprised of a upper fairing section and a lower fairing section having an inferior surface and a superior surface, with the lower fairing section attached to an upper, sprung portion of a front fork suspension assembly of a motorcycle, and with said lower fairing section substantially enclosing a front wheel of said motorcycle and a lower un-sprung portion of said front fork suspension assembly, and with the superior surface of said lower fairing section forming a convex, semi-circular curve, with a central opening in the superior and the inferior surfaces of said lower fairing section, of a width and length to allow a vertical movement of the front wheel and the lower un-sprung portion of the front fork assembly, through and independent of said lower fairing section, and with the upper fairing section attached to a main frame of the motorcycle and located on each side of said main frame of the motorcycle and extending forward beyond the front fork suspension assembly and a handlebar attached to the upper sprung portion of said front fork suspension assembly, without said upper fairing section having direct attachment to said front fork suspension assembly, and with each side of said upper fairing coming together at the most forward extension of said sides to form a curved yoke, with a smooth, curved anterior surface, and with an inferior portion of said upper fairing being adjacent to the lower fairing section substantially enclosing the front wheel of the motorcycle, with a inferior edge of said upper fairing section forming a concave, semi-circular curve immediate to and exactly conforming with the convex, semi-circular curve of the superior surface of the lower fairing section, both fairing sections together substantially enveloping in a single aerodynamic enclosure, the front wheel, the front fork suspension assembly, the handlebar attached to said upper fork suspension assembly, and an area parallel to each side of the motorcycle main frame and an engine located within said main frame of the motorcycle, with free lateral rotation of the front wheel, front fork suspension assembly, and the attached handlebar, independent of the upper fairing section, and free vertical movement of the front wheel and lower un-sprung portion of the front fork suspension assembly, independent of the lower fairing section.

* * * * *